United States Patent [19]

Watanabe et al.

[11] Patent Number: 5,918,011
[45] Date of Patent: Jun. 29, 1999

[54] METHOD FOR EXECUTION OF PROGRAM STEPS BY A REMOTE CPU IN A COMPUTER NETWORK

[75] Inventors: Hitoshi Watanabe, Yokohama; Tsuneaki Kadosawa, Kanagawa-ken; Takashi Nakamura, Hiratsuka; Eiji Koga, Hadano; Satoshi Asada, Tokyo, all of Japan

[73] Assignee: Canon Kabushiki Kaisha, Tokyo, Japan

[21] Appl. No.: 08/898,558

[22] Filed: Jul. 22, 1997

Related U.S. Application Data

[63] Continuation of application No. 08/475,416, Jun. 7, 1995, abandoned, which is a continuation of application No. 08/088,361, Jul. 9, 1993, abandoned.

[30] Foreign Application Priority Data

Jul. 10, 1992 [JP] Japan ................................. 4-206181

[51] Int. Cl.$^6$ .................................................. G06F 15/16
[52] U.S. Cl. .............................. 395/200.35; 395/200.31
[58] Field of Search ........................... 395/200.35, 200.31

[56] References Cited

U.S. PATENT DOCUMENTS

| | | | |
|---|---|---|---|
| 3,631,405 | 12/1971 | Hoff et al. | 340/172.5 |
| 4,130,865 | 12/1978 | Heart et al. | 364/200 |
| 4,149,244 | 4/1979 | Anderson et al. | 395/800 |
| 4,356,547 | 10/1982 | Barcaroli et al. | 395/800 |
| 4,413,318 | 11/1983 | Herrington | 364/200 |
| 4,589,068 | 5/1986 | Heinen, Jr. | 364/300 |
| 4,591,977 | 5/1986 | Nissen et al. | 395/200.08 |
| 4,651,300 | 3/1987 | Suzuki et al. | 395/200.08 |
| 4,750,115 | 6/1988 | Sekiya et al. | 395/200.08 |
| 4,860,191 | 8/1989 | Nomura et al. | 364/200 |
| 4,926,318 | 5/1990 | Nakayama | 395/200 |
| 4,961,132 | 10/1990 | Uehara | 395/200 |
| 5,163,122 | 11/1992 | Urabe et al. | 395/109 |
| 5,167,023 | 11/1992 | de Nicolas et al. | 395/375 |
| 5,167,035 | 11/1992 | Mann et al. | 395/800 |
| 5,168,560 | 12/1992 | Robinson et al. | 395/800 |
| 5,179,699 | 1/1993 | Iyer et al. | 395/800 |
| 5,179,702 | 1/1993 | Spix et al. | 395/650 |
| 5,191,652 | 3/1993 | Dias et al. | 395/200.08 |
| 5,257,375 | 10/1993 | Clark et al. | 395/650 |
| 5,357,612 | 10/1994 | Alaiwan | 395/200.08 |
| 5,418,913 | 5/1995 | Fujimoto | 395/200.08 |
| 5,428,803 | 6/1995 | Chen et al. | 395/800 |
| 5,517,654 | 5/1996 | Kimbel et al. | 395/800 |

*Primary Examiner*—Robert B. Harrell
*Assistant Examiner*—Saleh Najjar
*Attorney, Agent, or Firm*—Fitzpatrick, Cella, Harper & Scinto

[57] ABSTRACT

Each CPU registers jobs of its own in the form of nodes in a normal node queue, executes the registered jobs in a registration order, has a queue (remote node queue) for registering a job requested by another CPU in the form of a node, and executes the remote nodes in a registration order as in the normal nodes. When the first CPU causes the second CPU to execute a job, the first CPU transmits the job in the form of a node processed by the second CPU. The second CPU registers the received node in the remote node queue and executes it as in the normal node. The second CPU sends back, to the first CPU, the processing result of the received node in the form of a node processed by the first CPU, as needed.

8 Claims, 4 Drawing Sheets

FIG. 6

| VARIABLE | CPU |
|----------|-----|
| a | A |
| b | B |
| ⋮ | ⋮ |

METHOD FOR EXECUTION OF PROGRAM STEPS BY A REMOTE CPU IN A COMPUTER NETWORK

This application is a continuation of application Ser. No. 08/475,416 filed Jun. 7, 1995, now abandoned, which is a continuation of application Ser. No. 08/088,361 filed Jul. 9, 1993, now abandoned.

BACKGROUND OF THE INVENTION

1. Field of the Invention

The present invention relates to a job execution method in which one CPU causes another CPU to execute a job in a multi-CPU system.

2. Related Background Art

In a conventional system of this type, when the first CPU causes the second CPU to execute a job, the first CPU converts a job to be executed into a program in accordance with a predetermined format and transmits the program to the second CPU. The second CPU which has received this program decodes and executes the transmitted job in accordance with a predetermined format. The execution result is processed into a form in accordance with a predetermined format, if necessary. The result is sent back to the first CPU as the job transmission source. That is, on the transmission side in this conventional method, the job must be processed into a transmission format. On the reception side, the information received in the transmission format must be decoded. In addition, when the first CPU causes the second CPU to execute the job, a necessary transmission statement must be contained in the program.

In the conventional information processing apparatus, the job must be processed into a predetermined format prior to transmission of the job to be executed by the second CPU. The second CPU as the CPU which will receive the job must decode the reception data into a form executed in accordance with a predetermined format. Two processing mechanisms, i.e., pre-transmission processing and post-reception processing, must be prepared on the CPUs in addition to the program execution mechanisms inherent to the CPUs. The size of each CPU is undesirably increased, and the program execution speed is decreased due to complicated processing. In addition, since a programmer must write a necessary communication statement in the program, the load of the programmer is undesirably increased.

SUMMARY OF THE INVENTION

It is an object of the present invention to eliminate processing for converting a job into a transmission format on the transmission side when one CPU causes another CPU to execute the job.

It is another object of the present invention to eliminate processing for decoding a job received in a transmission format on the reception side when one CPU causes another CPU to execute the job.

It is still another object of the present invention to reduce the program size of each CPU in a system in which one CPU can cause another CPU to execute the job.

It is still another object of the present invention to reduce the program size of each CPU and increase the program execution speed in a system in which one CPU can cause another CPU to execute the job.

It is still another object of the present invention to eliminate a necessary complicated inter-CPU communication statement in a program prepared by a programmer in a system in which one CPU can cause another CPU to execute the job.

According to one aspect, the present invention which achieves these objectives relates to a job execution method in a multi-CPU system, comprising the steps of: causing a first CPU to detect a job to be executed by a second CPU; causing the first CPU to transmit a detected job to the second CPU in a processing node executed by the second CPU; causing the second CPU to register a received processing node; and causing the second CPU to execute a registered processing node.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a table representing a correspondence between variable names and CPU names.

DESCRIPTION OF THE PREFERRED EMBODIMENTS

Figure 1:
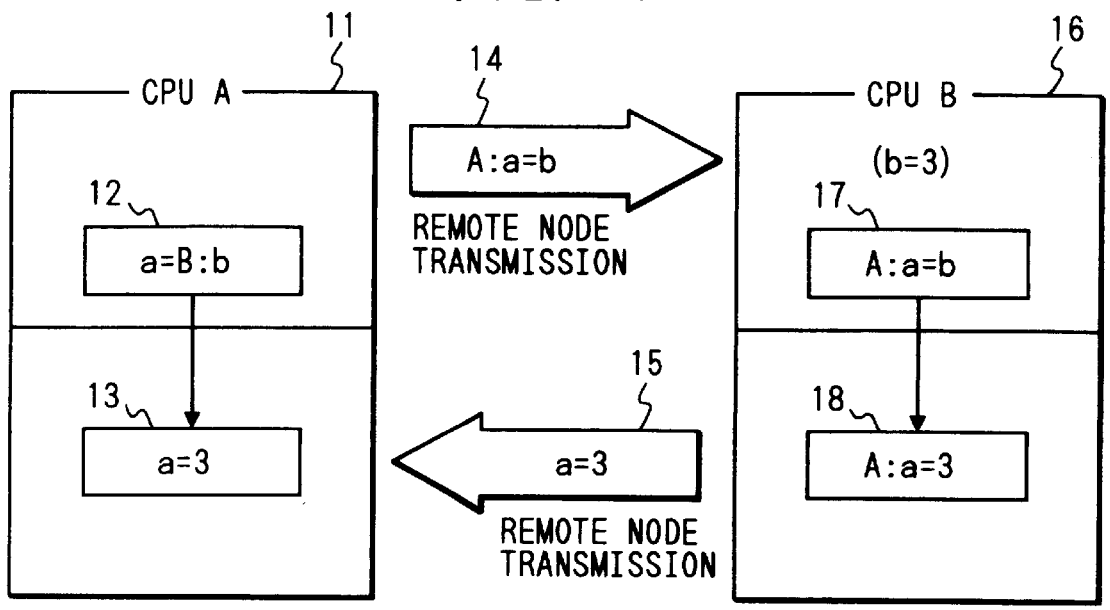
FIG. 1 is a view for explaining communication processing between CPUs in an embodiment.

FIG. 1 is a view for explaining communication processing between CPUs according to an embodiment of the embodiment.

Referring to FIG. 1, a CPU A 11 is a single-CPU system. In this embodiment, the CPU A 11 serves as a job transmission source CPU for transmitting a job to another CPU. A CPU B 16 is a single-CPU system and serves as a CPU for executing a remote node (i.e., a step or instruction sent from a remote CPU) transmitted from the CPU A 11 and sending back the execution result to the CPU A 11. A job 12 is set in the CPU A 11 and is to be executed by the CPU B 16. A job 13 is a job sent back from the CPU B 16 and is executed by the CPU A 11. Remote node data 14 is sent back from the CPU A 11 to the CPU B 16. Remote node data 15 is sent back from the CPU B 16 to the CPU A 11. A remote node 17 is transmitted from the CPU A 11 so as to be executed by the CPU B 16. A job 18 represents a result obtained by executing the remote node 17 in the CPU B 16 and is to be transmitted to the CPU A 11.

In the information processing apparatus having the above arrangement, when the CPU A 11 detects a step to be executed by the CPU B 16 during execution of a step registered in a normal node queue, a remote node transmission unit (formed by the function of the CPU A 11) generates remote node data 14 to be executed by the CPU B 16 and transmits the generated remote node data 14 to the designated CPU B 16. Upon reception of the transmitted remote node 14, the CPU B 16 holds the received remote node in a remote node queue. During sequential execution of steps registered in the normal node queue, the step held in the remote node queue is executed. A remote node response unit sends back an execution result 18 as remote node data 15 to the CPU A 11 as the transmission source. Pre-transmission processing and post-reception processing which are required in each CPU in the conventional system when one CPU causes another CPU to execute a job can be eliminated from a monitor program.

Figure 2:
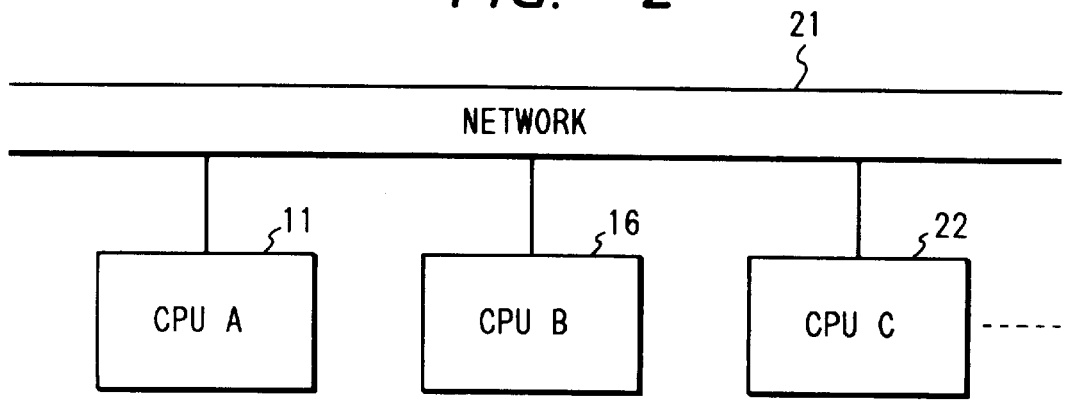
FIG. 2 is a block diagram showing the arrangement of a multi-CPU system.

FIG. 2 is a block diagram for explaining the arrangement of a CPU system in which single-CPU systems shown in FIG. 1 are networked.

Referring to FIG. 2, a network 21 connects a plurality of CPUs. A CPU C 22 is a single-CPU system and is connected to communicate with the CPU A 11 and the CPU B 16 as other single-CPU systems through the network 21.

Figure 3:
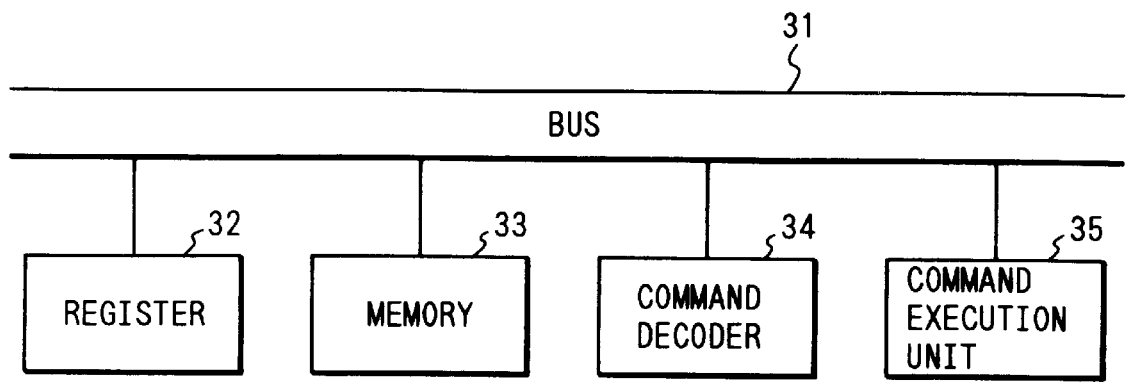
FIG. 3 is a block diagram showing the arrangement of each CPU.

FIG. 3 is a block diagram for explaining the arrangement of each single-CPU system shown in FIG. 2.

Referring to FIG. 3, a register 32 temporarily stores data or a calculation result. A memory 33 stores a program or data. Programs include a user program and a monitor program. Programs such as a processing sequence (FIG. 5) stored in the memory are sent to a command decoder 34 through a bus 31 and are decoded in the command decoder 34. The decoding result is sent to and executed by a command execution unit 35.

Figure 4:
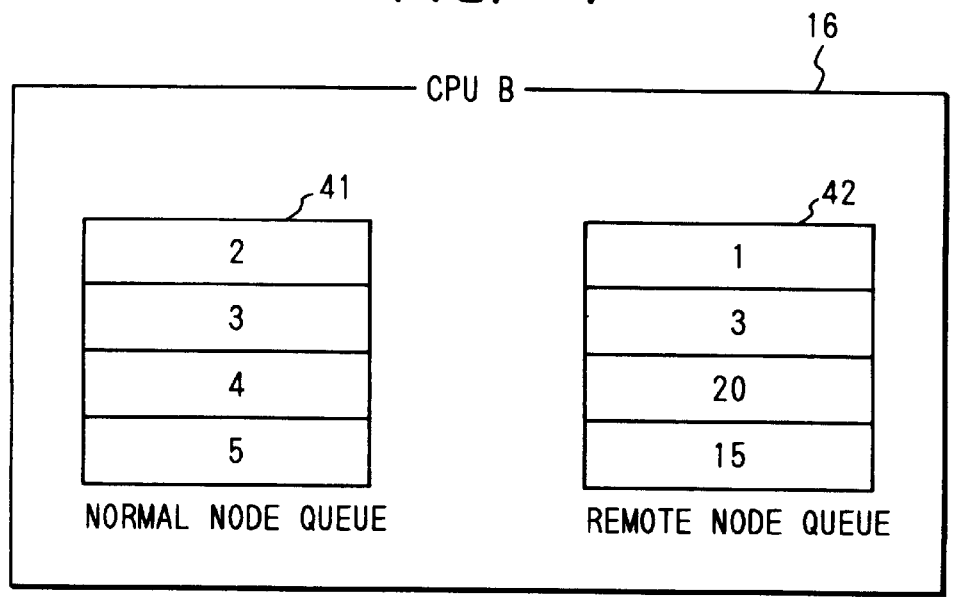
FIG. 4 is a view showing states of node and remote queues.

FIG. 4 is a view showing states of normal and remote node queues in the CPU B 16 shown in FIG. 1.

As shown in FIG. 4, the CPU B 16 sequentially executes steps (nodes) corresponding to step numbers registered in a normal node queue 41. When a remote node is sent from another CPU (i.e., CPU A), this remote node is registered in a remote node registration area in the CPU B (not shown), and the corresponding step number is registered in a remote node queue 42 of CPU B. If any step number is registered in the remote node queue 42, the CPU B 16 executes the remote node in preference to nodes registered in the normal node queue 41. In this manner, each single-CPU system comprises the remote node queue 42 for registering the step number of a step sent from another single-CPU system. If a step (remote node) is present in the remote node queue 42, the step number of the remote node is read out, and the readout step from another single-CPU system is executed in the same processing sequence as in the steps in the program of its own.

Figure 5:
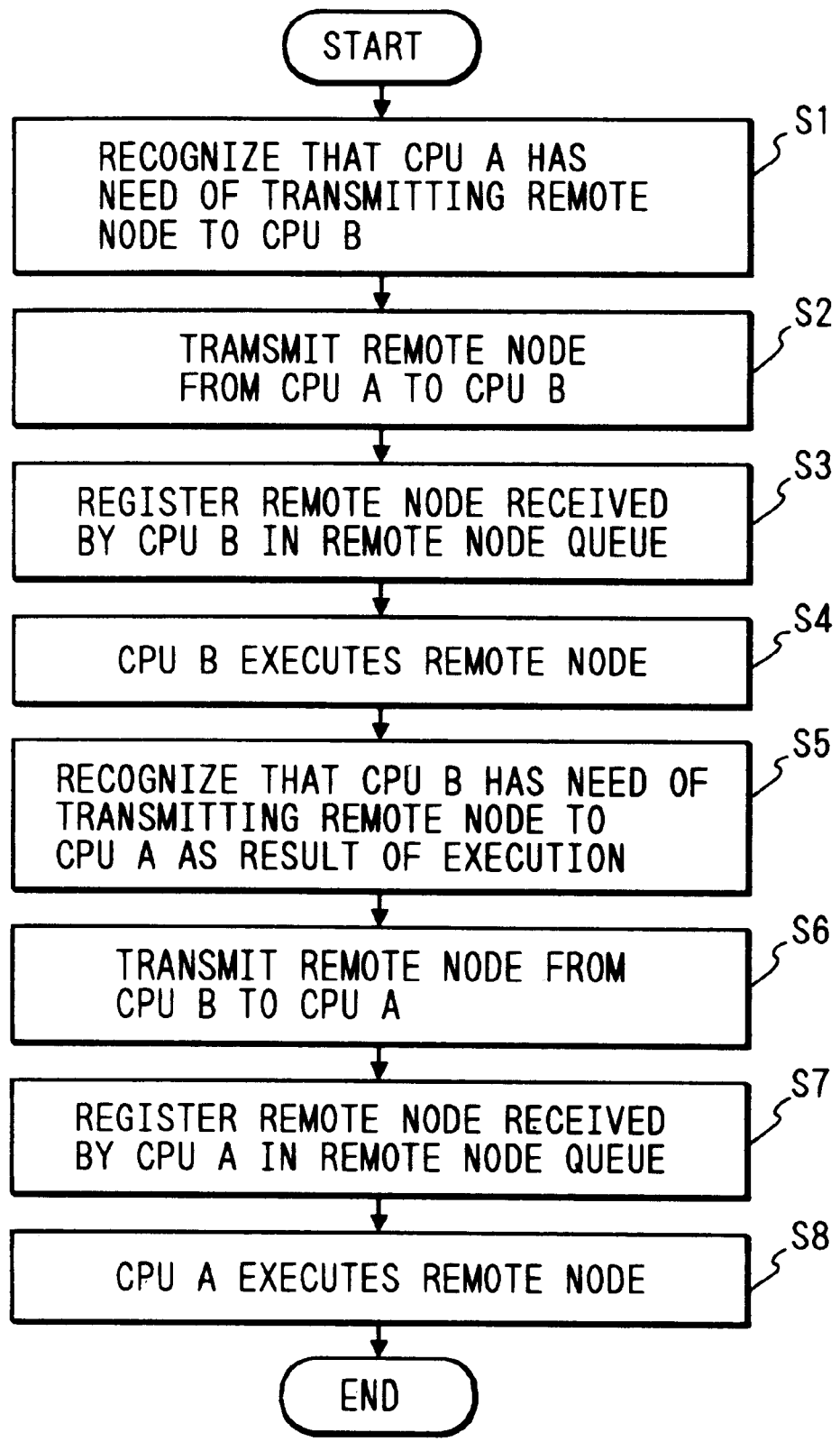
FIG. 5 is a flow chart of processing when one CPU causes another CPU to execute a job.

FIG. 5 is a flow chart showing the processing sequence of a remote node in the multi-CPU system according to the present invention. Referring to FIG. 5, steps S1, S2, S7, and S8 are executed by the CPU A 11, and steps S3 to S6 are executed by the CPU B 16.

In step S1, as shown in FIG. 1, during execution of a normal node, the CPU A 11 detects the job 12 "a=B:b" (a variable b of the CPU B 16 is substituted into a variable a) and recognizes that a remote node is to be transmitted to the CPU B 16 in order to know the contents of the variable b in the CPU B 16. In step S2, the CPU A 11 transmits the remote node 14 "A:a=b" (the variable b is substituted into the variable a of the CPU A 11) to the CPU B 16.

On the other hand, in step S3, the CPU B 16 registers the remote node 14 as the remote node 17 in a node registration area (not shown) and registers the step number corresponding to this node in the remote node queue 42. In step S4, when the CPU B 16 recognizes that the step number is registered in the remote node queue 42, the CPU B 16 executes a node (i.e., the remote node 17) corresponding to the step number registered in the remote node queue 42 in preference to the normal node corresponding to the step number registered in the normal node queue 41. In this case, since b=3, then the CPU B 16 obtains the job 18 "A:a=3" (3 is substituted into the variable a of the CPU A 11). In step S5, the CPU B 16 recognizes necessity of sending a remote node to the CPU A 11 in accordance with the contents of the job 18. In step S6, the CPU B 16 transmits the remote node 15 "a=3" (substitution of 3 into the variable a) to the CPU A 11.

In step S7, the CPU A 11 registers the remote node 15 as the remote node 13 in a node registration area (not shown) and registers a step number corresponding to this node in the remote node queue 42. In step S8, when the CPU A 11 recognizes that the step number is registered in the remote node queue 42, the CPU A 11 executes a node (i.e., the remote node 13) corresponding to the step number registered in the remote node queue 42 more preferentially than the normal node corresponding to the step number registered in the normal node queue 41. As a result, the value "3" as the value of the variable of the CPU B 16 is substituted into the variable a. The job 12 of the CPU A 11 "a=B:b" (substitution of the variable b of the CPU B 16 into the variable a) is completed.

In the above embodiment, a plurality of step numbers of the steps to be executed next are stored in the form of queues. In this case, step numbers associated with a plurality of processing operations are registered in a single queue in one CPU, and steps corresponding to the step numbers are executed in a registration order, thereby realizing pseudo parallel processing. However, if one processing operation is to be performed in one CPU, only the next step number need be registered.

In the above embodiment, when a remote node is registered, it is executed in preference to a normal node. However, the processing of the present invention is not limited to this. For example, a normal node may be executed in preference to a remote node, or the priority order of nodes may be predetermined, and execution may be performed in accordance with this priority order.

In the above embodiment, a remote node is executed for each step because the step is the minimum unit in processing a program. However, in a program having a hierarchical structure in which a set of steps constitute a subprogram, and a set of subprograms constitute a program, a remote node may be executed for each subprogram or program.

Figure 6:
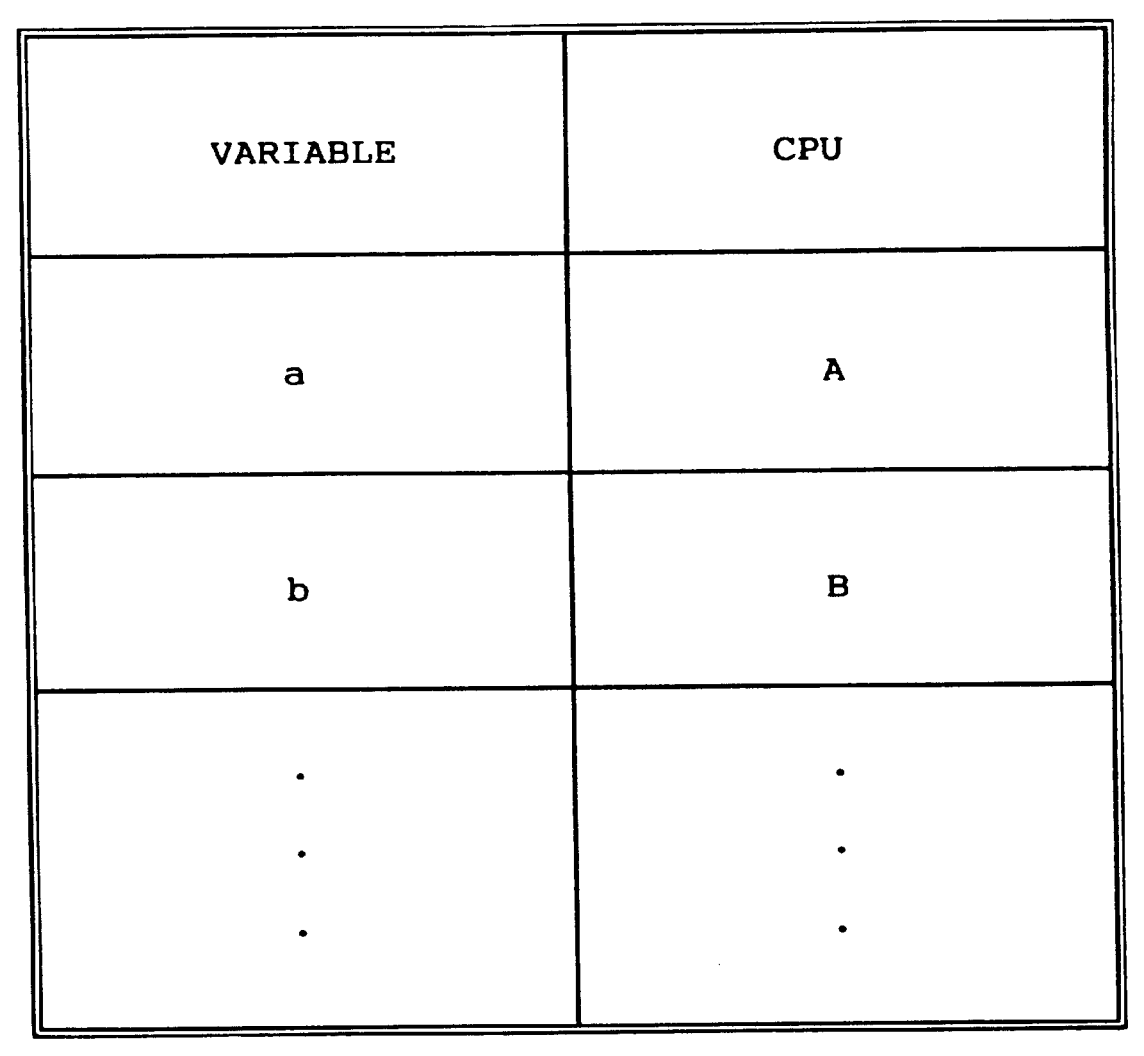

In the above embodiment, as indicated by the job 12, the remote node 17, and the job 18, the name of another CPU system to which a given variable belongs is assigned to the given variable. However, this assignment is not essential in the present invention. A table representing a correspondence between variable names and CPU names to which the variables belong may be prepared in advance as shown in FIG. 6, and a monitor program for executing and managing a program automatically determines whether a variable in question is a variable in another CPU. In this manner, a program format in which a programmer does not feel the presence of another CPU can be achieved.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A job execution method in a multi-processing unit system, wherein a first central processing unit (CPU) and a second CPU are connected to a network, said method comprising the steps of:

detecting in the first CPU, a first processing job containing a variable which belongs to the second CPU from among plural processing jobs, each of which is registered in a form of a processing node in a normal queue in the first CPU;

creating in the first CPU, a second processing job, in the form of a processing node which is directly executable by the second CPU, for requesting the second CPU to substitute a value for the variable in the first processing job;

transmitting, by the first CPU, the second processing job to the second CPU;

registering in a remote queue in the second CPU, the second processing job transmitted from the first CPU, in the form of a processing node which is directly executable by the second CPU;

executing in the second CPU, the second processing job transmitted from the first CPU and registered in the remote queue to substitute the value for the variable which belongs to the second CPU in the first processing job;

creating in the second CPU, a third processing job from the result of executing the second processing job, in the form of a processing node which is directly executable by the first CPU, the third processing job corresponding to the first processing job such that the value belonging to the second CPU has been substituted for the variable;

transmitting, by the second CPU, the third processing job to the first CPU in the form of a processing node which is directly executable by the first CPU;

registering in a remote queue in the first CPU the third processing job transmitted from the second CPU in the form of a processing node which is directly executable by the first CPU; and executing in the first CPU the third processing job registered in the remote queue in the first CPU.

2. A method according to claim 1, wherein the second CPU registers a plurality of nodes transmitted from the first CPU in the remote queue and executes the plurality of nodes in a registration order.

3. A method according to claim 2, further comprising the steps of:

registering, in the second CPU a plurality of nodes corresponding to a program under execution into a normal queue different from the remote queue for registering the plurality of nodes transmitted from the first CPU; and executing, in the second CPU, the plurality of nodes registered in the normal queue in an order of registration.

4. A method, according to claim 3, wherein the nodes registered in the remote queue are executed first when the nodes are registered in both the normal queue and the remote queue.

5. A method according to claim 3, wherein the nodes registered in the normal queue are executed first when the nodes are registered in both the normal queue and the remote queue.

6. A method according to claim 1, wherein in said detecting step an identifier of the second CPU added to the variable in the first processing job is detected by the first CPU to determine that the variable belongs to the second CPU.

7. A method according to claim 1, wherein the first CPU includes a table representing a correspondence between variables and CPUs to which the variables belong, and wherein the first CPU refers to the table to detect that a variable described in the first processing job is present in the second CPU.

8. A multi-processing unit system, comprising a network, and a first central processing unit (CPU) and a second CPU connected to said network, said first CPU comprising:

detection means for detecting, in said first CPU a first processing job containing a variable which belongs to the second CPU from among plural processing jobs each of which is registered in a form of a processing node in a normal queue in said first CPU;

first creation means for creating a second processing job for requesting said second CPU to substitute a value for the variable in the first processing job, in the form of a processing node which is directly executable by said second CPU;

first transmission means for transmitting the second processing job to said second CPU; and first registration means for registering, in a remote queue in said first CPU a processing job transmitted from said second CPU in the form of a processing node which is directly executable by said first CPU;

first execution means for executing the processing jobs registered in the normal queue and the remote queue in said first CPU;

said second CPU comprising:

second registration means for registering in a remote queue in said second CPU the second processing job transmitted from said first CPU in the form of a processing node which is directly executable by said second CPU;

second execution means for executing the second processing job transmitted from said first CPU and registered in the remote queue in said second CPU to substitute the value for the variable which belongs to said second CPU in the first processing job;

second creation means for creating a third processing job from the result of executing the second processing job, in the form of a processing node which is directly executable by said first CPU, the third processing job corresponding to the first processing job in which the variable belonging to said second CPU has been substituted for the variable; and second transmission means for transmitting the execution of the third processing job to said first CPU in the form of a processing node which is directly executable by said first CPU.

\* \* \* \* \*